Patented Jan. 10, 1939

2,143,520

UNITED STATES PATENT OFFICE 2,143,520

N-BIPHENYL OXAMIC ACID AND DERIVATIVES THEREOF

John E. Malowan, Anniston, Ala., assignor to Monsanto Chemical Company, St. Louis, Mo., a corporation of Delaware No Drawing. Application March 23, 1936, Serial No. 70,407

1 Claim. (Cl. 260—518)

This invention relates to N-para-biphenyl-oxamic acid (para-phenyloxanilic acid or para-xenyloxamic acid) and derivatives thereof. The new compounds herein described are of value as raw materials for antioxidants and age resistors for rubber and allied products.

The new compounds herein described and claimed may be prepared as follows:

*Example 1.*—Sixteen (16) grams of 4-aminodiphenyl were heated with 10 grams of oxalic acid for 16 hours to a maximum temperature of 160° C. The product was extracted three times with cold benzene to remove excess of 4-aminodiphenyl. The extraction residue was then boiled with alcohol and filtered hot. On cooling the filtrate a small amount of fine crystalline material having a red coloration was obtained; the product had a melting point of 220° C. (uncorrected).

The crystalline product, melting at 220° C., was identified as para-phenyloxanilic acid (N-p-biphenyloxamic acid or p-xenyloxamic acid) and may be represented by the formula:

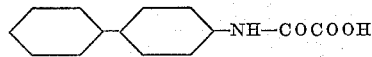

The residue from the extraction did not melt below 300° C. The nitrogen content agreed with the theory for di-(p,p'-phenyl)-oxanilide (N,N'-di-(p,p'-biphenyl)-oxamide) which probably has the formula:

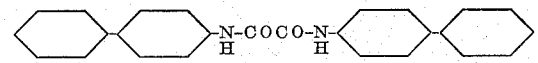

*Example 2.*—Sixty (60) grams of N-ortho-biphenyloxamic acid (ortho-phenyloxanilic acid, ortho-xenyloxamic acid) are heated with 100 grams of 4-aminodiphenyl for 20 hours at a temperature of 120° C. The product is extracted with cold benzene and the extracts containing the unreacted 4-aminodiphenyl are discarded. The residue is then boiled with benzene and filtered hot. The benzene solution upon cooling deposits crystals which have a melting point of approximately 159° C. These consist principally of unreacted ortho-biphenyloxamic acid. The residue remaining behind after extraction contains the compound, N,N'-di-(o,p'-biphenyl)-oxamide, which darkens but does not melt up to 270° C. The product corresponds to the structural formula:

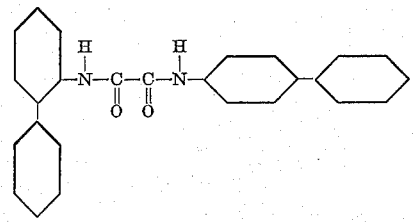

The N-ortho-biphenyloxamic acid used for the above preparation may be made in a manner similar to that used for the preparation of N-para-biphenyloxamic acid in Example 1, for example, by heating a mixture of 120 grams of ortho-aminodiphenyl and 100 grams of oxalic acid at 120° C. The mixture at first melts to a clear liquid and then steam is evolved with considerable foaming. After approximately three hours the mixture becomes solid. It is then extracted with boiling benzene. The solution is cooled and crystals that are slightly pink in color are obtained. The crystals are washed with cold benzene and water. The purified N-ortho-biphenyloxamic acid melts at 155° C.

The compounds of this invention may be designated as having the general structure:

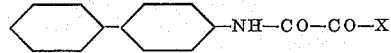

where X may be either OH or a radical of the formula —NHC$_6$H$_4$C$_6$H$_5$.

Having now particularly described my invention and the manner in which the same may be prepared, I desire that my invention be not limited except as indicated by the prior art, or as particularly pointed out in the appended claim.

What I claim is:

The compound, N-p-biphenyloxamic acid, said compound being a crystalline solid having a melting point of approximately 220° C.

JOHN E. MALOWAN.